United States Patent [19]

Kaaber et al.

[11] Patent Number: 5,558,847
[45] Date of Patent: Sep. 24, 1996

[54] PROCESS FOR RECOVERING ALUMINIUM AND FLUORINE FROM FLUORINE CONTAINING WASTE MATERIALS

[76] Inventors: Henning Kaaber, Den Gamle Skole, DK-3520 Farum; Mogens Mollgaard, Søtofteparken 3, DK-3660 Stenløse, both of Denmark

[21] Appl. No.: 435,279

[22] Filed: May 5, 1995

Related U.S. Application Data

[63] Continuation of Ser. No. 296,261, Aug. 25, 1994, abandoned, which is a continuation of Ser. No. 98,311, Nov. 8, 1993, abandoned.

[30] Foreign Application Priority Data

Feb. 5, 1991 [DK] Denmark .................. 0193/91

[51] Int. Cl.$^6$ .................................. C01F 7/00
[52] U.S. Cl. .................. 423/111; 423/122; 423/127; 423/132; 423/131; 23/305 A; 588/248
[58] Field of Search .................. 423/111, 122, 423/127, 132, 495, 131; 23/305 A; 588/248

[56] References Cited

U.S. PATENT DOCUMENTS

| | | | |
|---|---|---|---|
| 2,186,433 | 1/1940 | Schwemmer .................. | 23/88 |
| 2,858,198 | 10/1954 | MoGeer et al. .................. | 23/294 |
| 4,044,095 | 8/1977 | Hudson et al. .................. | 423/127 |
| 4,508,689 | 4/1985 | Bush .................. | 423/127 |
| 4,567,026 | 1/1986 | Lisowyj .................. | 423/81 |
| 4,597,953 | 7/1986 | Bush .................. | 423/132 |
| 4,889,695 | 12/1989 | Bush .................. | 423/132 |
| 4,900,535 | 2/1990 | Goodes et al. .................. | 423/848 |
| 5,271,910 | 12/1993 | van der Meer et al. .................. | 423/55 |
| 5,352,419 | 10/1994 | Jenkins .................. | 423/126 |

FOREIGN PATENT DOCUMENTS

| | | |
|---|---|---|
| 0117616 | 10/1988 | European Pat. Off. . |
| 54-120219 | 9/1979 | Japan .................. 423/127 |
| 2056422 | 3/1981 | United Kingdom . |

Primary Examiner—Gary P. Straub
Assistant Examiner—Timothy C. Vanoy
Attorney, Agent, or Firm—Ostrolenk, Faber, Gerb & Soffen, LLP

[57] ABSTRACT

Aluminum and fluorine are recovered from fluorine containing waste materials from the production of aluminum metal (FCWM) as $AlF_2OH$ hydrate by a process comprising: leaching FCWM with dilute sulphuric acid at a pH value within the range of 0–3; if needed adding aluminum in an acid soluble form; adjusting the pH value of the aqueous phase to a value within the range 3.7–4.1 at the end of the leaching period by addition of a caustic aqueous solution; precipitating silica at a temperature not exceeding 60° C.; separating the reaction mixture into a solid phase containing precipitated silica and non-soluble residues of the FCWM and a purified solution; and precipitating $AlF_2OH$ hydrate from the purified solution at a temperature within the range 90°–100° C. and at a pH value not exceeding about 4.1 by controlled continuous addition of an aqueous caustic solution. Reducing and/or non-oxidizing operating conditions are maintained during all these process steps. The precipitated $AlF_2OH$ may be calcined at a temperature within the range 500°–600° C to produce $AlF_3$, $Al_2O_3$, which is expedient for use in processes for the production of aluminum metal by electrolytic production of alumina.

20 Claims, 1 Drawing Sheet

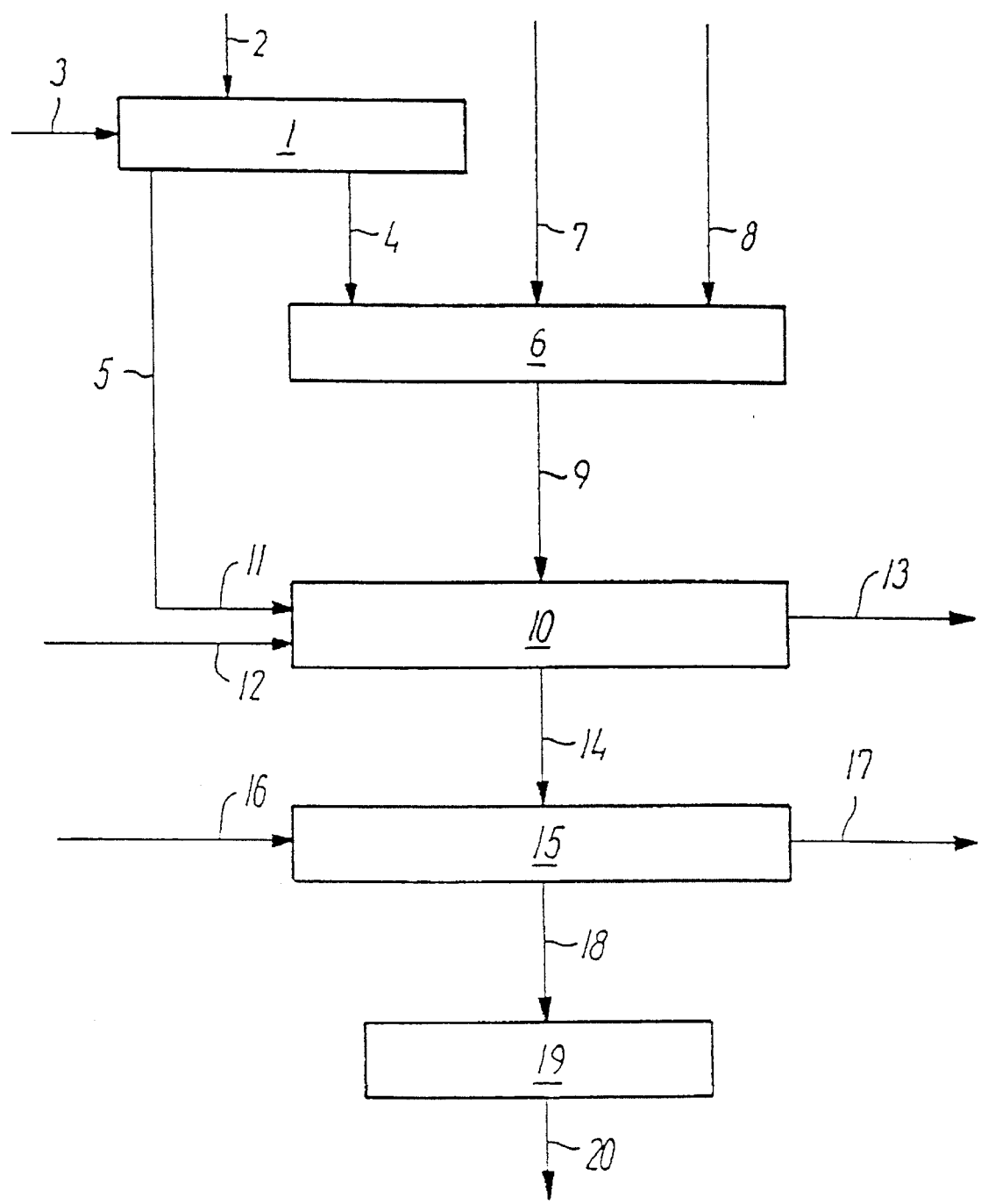

PROCESS FOR RECOVERING ALUMINIUM AND FLUORINE FROM FLUORINE CONTAINING WASTE MATERIALS

This is a continuation of application Ser. No. 08/296,261 filed on Aug. 25, 1994, now abandoned, which was a continuation of application Ser. No. 08/098,311 filed on Nov. 8, 1993, now abandoned.

BACKGROUND OF THE INVENTION

The invention relates to a process for recovering aluminium fluoride from fluoride containing waste materials from the production of aluminium metal (hereinafter FCWM).

Such processes are of technological importance
partly because depositing of FCWM is not acceptable for environmental reasons due to leaching out of fluorides and other ecologically harmful salts by the action of rain water
partly because FCWM is an easily accessible, inexpensive starting material for the production of $AlF_3$ which can be used in processes for the production of aluminium by electrolytic reduction of alumina.

Typical examples of FCWM include:

spent potlining retrieved from an aluminium electrolytic reduction cell (SPL);

spent potlining ash (SPLA) produced by incinerating SPL;

cold bath material, i.e. solidified electrolyte from the electrolytic reduction cells, the composition being a mixture of cryolite, chiolite, aluminium fluoride, calcium fluoride, and aluminium oxide; and other fluorine containing waste materials, such as filter dust and black sooth.

The chemical composition of FCWM may vary within wide limits, but the main components are $NaF$, $AlF_3$, $NaF \cdot AlF_3$ double salts, including cryolite, Al metal, $Al_2O_3$, silica and mixed silicates and sodium carbonate and hydroxide. SPL comprises further a rather large amount of carbon and refractory lining material.

Thus a typical sample of SPL may contain the following components within the indicated ranges:

| | |
|---|---|
| NaF | 8–12% |
| $3NaF,AlF_3$ (cryolite) | 12–16% |
| $Na_2CO_3$ | 3–7% |
| NaOH | 3–5% |
| C | 25–50% |
| $Al_2O_3$ (including Al metal) | 5–25% |
| $CaF_2$ | 2–4% |
| $SiO_2$ | 1–10% |

A typical sample of SPLA may contain the following components within the indicated ranges:

| | | |
|---|---|---|
| F | (mainly as NaF, $AlF_3$ and mixed fluorides): | 20–30% |
| Al | (mainly as Al metal, $Al_2O_3$, $AlF_3$ and mixed fluorides): | 10–25% |
| Na | (mainly as NaF, and mixed fluorides, and sodium oxide and carbonate): | 15–25% |
| Si | (mainly as silica and silicates): | 5–10% |
| C | (as carbon): | 2–10% |
| Ca | (mainly as oxide and fluoride): | 1–2% |

It has been suggested to recover fluorine from SPL by the so-called pyrohydrolysis processes comprising burning the carbon in the potlining;

raising the temperature to about 1200° C.;

reacting the fluorides with steam to produce hydrogen fluoride which is removed from the reaction zone as a gas.

The hydrogen fluoride might then be used for the production of $AlF_3$.

Such processes are described in e.g U.S. Pat. No. 2,858,198.

However, the pyrohydrolysis processes have not yet been utilized on a commercial scale even though these processes have been under development for more than 10 years. The most serious problems encountered during performance of the pyrohydrolysis processes are corrosion problems caused by the presence of $H_2O$ and HF at extreme temperatures.

It has further been suggested to recover fluorides as sodium and/or aluminium fluorides from e.g. SPL by wet processes.

For instance, it has been proposed to recover fluoride values such as cryolite from SPL material by treating finely divided SPL material with an aqueous caustic solution to effect a reaction between the fluoride values or cryolite therein with sodium hydroxide to yield water soluble sodium fluoride and water soluble sodium aluminate and then to acidify the resulting solution, e.g. by introduction of carbon dioxide, to precipitate cryolite therefrom. This method of recovering cryolite from cell lining material suffers from the disadvantage of requiring a considerable amount of excess sodium hydroxide which is costly while the time necessary to effect the reaction is somewhat prolonged with the further disadvantage that it is accompanied by much foaming due to gas formation.

Another alkaline leaching process in which fluorine is recovered as NaF is described in European patent specification 117 616.

In this process the cryolite-containing SPL is treated with an aqueous caustic soda solution in order to break down the cryolite into sodium fluoride and sodium aluminate.

According to one aspect the caustic soda solution contains from 200 to 400 g/l caustic (calculated as $Na_2CO_3$). The liquor is separated from the solid residue after the treatment and then the sodium fluoride is extracted from the solid residue by contacting with water (including a dilute aqueous sodium fluoride solution).

According to another aspect the caustic soda solution contains from 20 to 70 g/l caustic (calculated as $Na_2CO_3$). The caustic soda solution is separated from the undissolved residue, and concentrated by evaporation thereby causing the precipitation of solid sodium fluoride from said solution. Finally, the precipitated sodium fluoride is separated from the caustic soda solution.

However, the recovery of aluminium fluorides from FCWM is rather difficult when basic leaching methods are used because precipitation of aluminium and fluoride from an aqueous sodium containing solution will inevitably lead to cryolite as precipitated product, unless special and rather complicated measures are taken.

It has further been suggested to process SPLA and SPL by processes involving treatment with sulphuric acid.

In U.S. Pat. No. 4,900,535 there is described a process which involves treating SPLA with concentrated sulphuric acid at elevated temperatures, whereby the fluoride values are reacted to and withdrawn as HF.

A similar process for treating SPL is described in U.K. patent application 056,422 A.

These processes exhibit essentially the same inconveniences as the pyrohydrolysis processes and have not been carried out on a commercial scale.

It has also been suggested to recover Al and F from SPL by acid treatment processes operating at more moderate conditions in which fluorine is not recovered as gaseous HF.

In U.S. Pat. No. 2,186,433 there is described a process for recovery of aluminium and fluorine compounds, actually cryolite, from SPL, wherein the aluminium and fluorine compounds contained in the SPL are brought into solution by treating the SPL with a diluted aqueous leaching solution containing an acid selected from the group consisting of hydrochloric acid and sulphuric acid, and containing an aluminium salt of said acids. The aluminium and fluorine compounds contained in the extract so obtained are then precipitated as cryolite by the addition of hydrofluoric acid and an alkali salt.

However, these acid leaching processes present problems of their own which mainly consist in contamination of process liquors and precipitated end products due to dissolution of iron and silica and coprecipitation of iron hydroxides and silica; and environmentally unacceptable production of HCN, $H_2S$ and phosphines in the acid leaching step.

Other acid leaching processes have been suggested comprising a leaching step wherein comminuted SPL is leached with an aqueous acid solution;

a deironing step wherein iron is removed from the liquid phase produced in the filtration step; and a precipitation step wherein not cryolite but aluminium fluorides are precipitated from the liquid exit phase from the deironing step.

A variant of this process is described in U.S. Pat. No. 4,889,695 which relates to a two step leaching process wherein SPL is leached with a caustic solution, preferably having a concentration of about 14 g/L NaOH, in a first leaching step and subsequently with an acid aqueous solution of aluminium sulfate and sulfuric acid. After removal of iron from the liquor from the acid leaching step in a separate deironing step the two leaching liquors are united and aluminium fluoride is precipitated under carefully controlled conditions.

According to U.S. Pat. No. 4,597,953 improved fluoride recovery from SPL should be obtained by leaching with an aqueous acid leaching solution having an aluminium sulfate/sulfuric acid ratio in the range from about 0.75 to 1.0.

The precipitation of aluminium fluoride from a solution produced in an acid leaching method is complicated by the presence of "foreign ions", i.e. ions different from Al and F in the liquor. Sodium ions constitute a special problem because sodium and aluminium double salts, e.g. Chiolite and/or Cryolite, may be precipitated instead of aluminium fluoride in the precipitation step.

According to U.S. Pat. No. 4,508,689, an improved yield of sodium-poor aluminium fluoride hydroxide should be obtained when the precipitation is carried out from an acid solution of ions of Al, F and Na which is incompletely neutralized with a basic solution of a sodium compound to increase the pH into the range of about 5.0 to 5.6. According to the specification incomplete neutralization to pH values below about 5 results in a significant loss of fluorine values.

It is the object of the present invention to provide an improved wet process for recovering aluminium fluoride from FCWM, in particular from SPL and SPLA, whereby compared with the prior art the amount of fluoride extracted is increased leaching of less fine starting material is made possible and filtration problems are thereby reduced expenditure for chemicals is reduced the lay-out of the process is more simple the problems of co-precipitation of contaminating materials (such as Si, Fe and Na) are reduced there is precipitated an aluminium fluoride product, in the form of $AlF_2OH$ hydrate, with high purity it is possible to process starting materials having extremely varying compositions it is possible to obtain a uniform end product even when the starting materials exhibit extremely varying compositions.

SUMMARY OF THE INVENTION

In accordance with the present invention these objects are achieved by a process for recovering aluminium and fluorine from FCWM as $AlF_2OH$ hydrate comprising:

leaching FCWM with dilute sulphuric acid in an acid leaching step to produce an acid slurry containing fluorine, sodium and aluminium dissolved in the aqueous phase;

if needed, adjusting the amount of dissolved aluminium in the acid leaching step by addition of aluminium metal and/or acid soluble aluminium compounds so that the molar ratio "F"/"Al" is within the interval from about 1.8 to 2.2, where "F" designates the number of moles of leachable fluorine in the treated portion of FCWM and "Al" designates the number of moles of leachable aluminium in the treated portion of FCWM plus optionally added aluminium;

adjusting the amount of sulphuric acid added in the acid leaching step so that i) the molar ratio ("Na"/2+"F"/4)/"$SO^-_4$"

is less than or equal to 1,
where "Na" designates the number of moles of leachable sodium in the treated portion of FCWM plus the number of equivalents of caustic optionally added to the process in the steps preceeding a final $AlF_2OH$ precipitation step and "$SO^-_4$" designates the number of moles of sulfate ions added as $H_2SO_4$ or otherwise; and ii) the pH value of the aqueous phase in the aqueous slurry is kept within a range from about 0 to 3, preferably from about 1 to 2, during and at the termination of the leaching step;

withdrawing the acid slurry from the acid leaching step;

adjusting the pH of the aqueous phase in the slurry withdrawn from the acid leaching step to a value within the range from about 3.7 to 4.1 by addition of a caustic aqueous solution, preferably of sodium hydroxide, in a silica-precipitation step, at a temperature not exceeding 60° C.; and allowing silica to precipitate during a precipitation, ageing and sedimentation period of not less than 0.5–1 h;

separating the reaction mixture from the silica-precipitation step into a solid phase containing the precipitated silica and the non-soluble residues of the FCWM and a purified solution containing aluminium, fluorine and sodium as main components and iron as $Fe^{++}$ ions;

precipitating $AlF_2OH$ hydrate from the purified solution withdrawn from the silica precipitation step in an $AlF_2OH$ precipitation step by increasing the temperature of the solution to and maintaining the temperature at a value within the interval from about 90° C. to the boiling point of the aqueous phase, gradually increasing the pH value to about 3.7 to 4.1 by controlled continuous addition of an aqueous caustic solution, e.g. of sodium hydroxide;

maintaining reducing and/or non-oxidizing operating conditions during the acid leaching step, the silica precipitation step and the AlF$_2$OH precipitation step in order to prevent oxidation of Fe$^{++}$ to Fe$^{+++}$; and separating and withdrawing the precipitated AlF$_2$OH hydrate from the AlF$_2$OH precipitation step.

In the present text "the number of moles of leachable fluorine/aluminium/sodium in the treated portion of FCWM" is defined as the number of moles of fluorine/aluminium/sodium transferred to the aqueous phase in the leaching steps, comprising the acid leaching step and an optional preliminary leaching step which is further described below.

The number of moles of leachable fluorine/aluminium/sodium in the treated portion of FCWM can easily be determined by simple leaching experiments.

It has been found that optimum recovery of aluminium and fluorine values as AlF$_2$OH hydrate, including as well optimum leaching as optimum precipitation, is achieved when operating with an amount of aluminium ions in the leaching liquor in the acid leaching step which ensures that the molar ratio "F"/"Al", as defined above, is close to 2. For the same reason, it is important to operate with an amount of sulphuric acid in the leaching liquor which ensures that the molar ratio ("Na"/2+"F"/4)/"SO$^{--}_4$", as defined above, is not greater than 1.

In general FCWM exhibits a molar ratio between leachable fluorine and leachable aluminium between about 1 and 6.

When it is desired to recover aluminium and fluorine from an FCWM for which said molar ratio is less than about 2, it may be advantageous, but not necessary, to add another type of FCWM, such as e.g. cold bath material, having a high fluorine/aluminium ratio, i.e. a ratio grater than or equal to 3 and use this mixture as starting material.

The addition of aluminium ions to the acid leaching step is most conveniently performed by addition of aluminium metal, aluminium hydroxide, Al$_2$O$_3$ in acid soluble form, or aluminium sulfate either to a stock solution of dilute sulphuric acid for the acid leaching step or directly to the acid leaching step.

In order to prevent formation of gaseous hydrogen fluoride, it is important to maintain the pH value of the aqueous phase in the acid leaching step above about 0, preferably above about 1, during the leaching process. It is further important that the pH value is maintained below about 3, preferably below about 2, in order to prevent precipitation of silica, ferro hydroxide and aluminium fluorides during the acid leaching process.

It is an essential feature of the present invention that problems due to contamination of the end product with iron are avoided without performing a separate, rather cumbersome iron removal step. According to the present invention, these problems are avoided by ensuring that iron is exclusively present as ferro irons, Fe$^{++}$ and by preventing precipitation of ferro hydroxide by maintaining the pH value below about 5 during all process steps.

It is important that the pH adjustment in the silica-precipitation step is carried out in such way that pH values above about 5 are prevented even locally in order to prevent precipitation of ferro hydroxide and aluminium fluorides, including cryolite and the desired end product AlF$_2$OH hydrate. Therefore it is very important to add the caustic aqueous solution at a carefully controlled rate with effective agitation in order to prevent local over concentration of caustic.

It is further very important that the temperature does not exceed about 60° C. in the silica-precipitation step because precipitation of AlF$_2$OH hydrate will occur at temperature above about 60° C.

It is also very important to operate below and within the pH range from about 3.7 to 4.1 in the AlF$_2$OH hydrate precipitation step. Thereby coprecipitation of cryolite and other double salts as well as of ferro hydroxide is effectively prevented. In this step, it is also very important to add the caustic aqueous solution at a carefully controlled rate with effective agitation in order to prevent local over concentration of caustic.

The solid material withdrawn from the silica-precipitation step is a waste material which can be disposed of in an ecologically acceptable way.

The precipitated AlF$_2$OH hydrate product may be calcined at a temperature within the interval 500°–600° C. to yield a mixture of AlF$_3$ and Al$_2$O$_3$ which is suitable for reuse in processes for the production of aluminium by electrolytic reduction of alumina.

The process according to the invention is particularly suited for processing SPL and SPLA.

It is a characteristic advantageous feature of the present invention that even though the composition, including the fluorine/aluminium ratio, of the FCWM used as starting material may vary within wide limits, the present process will invariably yield a uniform AlF$_2$OH hydrate end product with a fluorine/aluminium ratio very close to 2.

A preferred embodiment of the present invention comprises subjecting the FCWM to a preliminary leaching process in a preliminary leaching step in which FCWM is leached with water or a weakly caustic aqueous leaching solution, e.g. of sodium hydroxide, to produce a first fluorine, sodium and aluminium containing caustic solution and a solid pre-leached FCWM;

transferring the pre-leached FCWM to the acid leaching step; and combining the caustic solution produced in the preliminary leaching step with the slurry from the acid leaching step in the silica-precipitation step.

Hereby a reduced consumption of sulphuric acid may be obtained. When leaching with water in the preliminary leaching step there is obtained a caustic aqueous solution which is utilized in the silica-precipitation step as caustic aqueous solution. If the alkalinity obtained herewith is not sufficient, sodium hydroxide may be added to the leaching liquor in the preliminary leaching step with resulting increased leaching efficiency.

According to a preferred embodiment, the weakly caustic aqueous solution is a solution of sodium hydroxide having a sodium hydroxide concentration which allows the desired pH adjustment in the silica-precipitation step to be obtained without further addition of a separate caustic aqueous solution.

However, for the reasons explained above it is important that a pH value less than or equal to about 4.1 is maintained in the silica-precipitation step when the caustic solution produced in the preliminary leaching step is combined with the slurry from the acid leaching step.

The acid leaching step is preferably carried out within a period of time from about 0.5 to 3 h at a temperature within the interval from about 50° to 90° C.

The duration of the preliminary leaching step is preferably from about 0.5 to 3 h and the preliminary leaching step is preferably carried out at a temperature within the interval from about 20° to 90° C., preferentially at a temperature enabling the desired temperature setting in the silica-precipitation step to be achieved by simple mixing of the caustic solution produced in the preliminary leaching step with the slurry from the acid leaching step.

It is an advantage of the present process that rather coarse FCWM may be used as starting material. According to a preferred embodiment of the present invention, the FCWM is only comminuted to a particle size of −7 mm before leaching.

The mixing of the reactants in the silica-precipitation step should be carried out with efficient agitation in order to prevent formation of local domains having a pH value above about 5, and thereby preventing undesired precipitation of ferro hydroxide and aluminium fluorides.

It is also important that the mixing of the reactants in the $AlF_2OH$ hydrate precipitation step is carried out with efficient agitation preventing formation of local domains having a pH value above about 5 and thereby preventing undesired precipitation of ferro hydroxide and mixed aluminium fluorides, such as cryolite and chiolite.

The leaching of iron values occurs essentially during the acid leaching step. Due to the general presence of aluminium metal in the FCWM during the acid leaching process, this process will generally proceed at reducing conditions ensuring that iron is leached as ferro ions. If the FCWM does not contain a sufficient amount of aluminium as aluminium metal, the added aluminium should comprise a necessary quantity of aluminium in form of aluminium metal to ensure reducing conditions in the acid leaching step.

As mentioned above, it is important that iron remains in solution as ferro ions. This may be ensured by operating under nitrogen atmosphere in the silica-precipitation step and the $AlF_2OH$ hydrate precipitation step.

The process may be carried out batch-wise or continuously. In the latter case, the above-mentioned durations should be understood as average durations.

When a given FCWM is treated by the process according to the invention including a preliminary leaching process, the necessary amount of aluminium and the necessary amount of sulphuric acid in the acid leaching liquor are calculated according to the rules given above. Hereby "Al" designates the number of moles of leachable aluminium in the FCWM introduced into the preliminary leaching process plus aluminium added, "Na" designates the number of moles of leachable sodium in the FCWM introduced into the preliminary leaching process plus the number of equivalents of caustic optionally added to the preliminary step and/or the silica-precipitation step, and "F" designates the number of moles of leachable fluorine in the FCWM introduced into the preliminary leaching process.

BRIEF DESCRIPTION OF THE DRAWING

The FIG. 1 shows a schematic flow diagram for a preferred embodiment of the process according to the invention comprising a preliminary step in which the FCWM is leached with water and a silica-precipitation step comprising precipitating with an additional aqueous sodium hydroxide solution.

DETAILED DESCRIPTION

The figure shows a reactor 1 for the preliminary leaching process provided with an inlet 2 for FCWM and an inlet 3 for water, an outlet 4 for solid material and an outlet 5 for aqueous extract. The outlet 4 is connected with an inlet in a reactor 6 for the acid leaching process which is further provided with an inlet 7 for dilute sulphuric acid solution, an inlet 8 for aluminium hydroxide, and an outlet 9 for acid slurry. The outlet 9 is connected with a slurry inlet in a reactor 10 for the silica-precipitation process which has an inlet 11 for aqueous extract connected with the outlet 5, an inlet 12 for dilute aqueous solution of sodium hydroxide, and an outlet 13 for solid precipitated material and an outlet 14 for an acid solution which is connected with an inlet in a reactor 15 for precipitating $AlF_2(OH)$ which is further provided with an inlet 16 for dilute aqueous solution of sodium hydroxide, an outlet 17 for filtrate and an outlet 18 for the precipitated $AlF_2(OH)$ hydrate product which is connected with a material inlet in a calcining kiln 19 which has an outlet 20 for calcined $AlF_3$, $Al_2O_3$ product.

In operation, SPL is subjected to extraction with water for 1 h in a leaching step in the leaching, reactor 1 at a temperature of about 20° C. A first fluorine sodium and aluminium containing caustic solution is withdrawn from the first leaching step via the outlet 5.

The solid material recovered from the first leaching step is via the outlet 4 transferred to a second leaching step in the reactor 6, aluminium hydroxide is added via the inlet 8, and the mixture is leached for 1 h with an aqueous solution of sulphuric acid introduced via the inlet 7 at a pH of about 0–2 at a temperature of about 85° C.

After final leaching, the acid slurry is transferred to the reactor 10, the temperature of the slurry is decreased to about 50° C. and the pH value is carefully raised to about 4 by introducing the aqueous extract from the reactor 1 and additional aqueous sodium hydroxide via the inlets 11 and 12, respectively.

The temperature of this mixture is kept at about 50° C. for about 1 h whereby silica is precipitated.

After removal of solid material (including the leached SPL), a clear aqueous solution is obtained and transferred, via the outlet 14, to the $AlF_2OH$ hydrate precipitation step in the reactor 15 where the temperature is increased to and kept at a temperature about 95° C. Hereby the pH value decreases to about 2 presumably due to the reaction

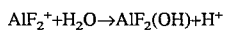

$$AlF_2^+ + H_2O \rightarrow AlF_2(OH) + H^+$$

$AlF_2(OH)$ is precipitated by continuous addition of aqueous sodium hydroxide solution introduced via the inlet 16 whereby it is ensured that the pH value of the solution is gradually increased to a value within the interval from about 3.7 to 4.1.

At the end of the precipitation period the reaction mixture is subjected to filtration, the aqueous filtrate is withdrawn via the outlet 17 and the $AlF_2(OH)$ hydrate product is withdrawn, washed with water, and transferred to the calcining kiln 19.

Finally, the $AlF_2(OH)$ hydrate is calcined at about 550° C. to form a mixture of $AlF_3$ and $Al_2O_3$.

In order to ensure that all iron remains as ferro iron, the silica-precipitation step and the $AlF_2OH$ hydrate precipitation step are carried Out under a nitrogen atmosphere.

In the following the invention is further illustrated by examples, in which "%" is to be understood as weight-% unless otherwise indicated.

EXAMPLE 1

SPL from Granges Aluminium, Sweden, with the following analysis: 15.85% Na, 10.75% Al and 14.42% F was crushed in a mill to −7 mm. 60 g of this material corresponding to 413 mmol Na, 239 mmol Al and 455 mmol F (F/Al=1.90) were extracted for 1 h at 90° C. with a mixture of 75 g of 9N sulfuric acid and 500 ml of demineralized water. At the end of the leaching process the aqueous phase in the slurry exhibited a pH of 2.2 and Al and F concentrations corresponded to 213.8 and 425.0 mmol, respectively.

The extraction yields obtained by the leaching process were 89.5% Al and 93.3% F. The molar ratio F/Al was 1.99 in the aqueous phase.

The slurry was cooled to 40° C. and neutralized with NaOH to pH 4.0 in 30 min. and allowed to age during a 1 h period before filtration. The solid material obtained by filtration was dried and weighed. On this basis, it was calculated that 51.5% of the FCWM were dissolved during the extraction.

The temperature of the filtrate was increased to 90° C. and AlF$_2$OH hydrate was precipitated by neutralizing with dilute NaOH according to the following scheme, nitrogen being bubbled through the solution to avoid formation of ferric ions:

| Time, min | pH Setpoint | pH* | ml used |
| --- | --- | --- | --- |
| 5 | 2.9 | 2.2 | 22 |
| 5 | 3.0 | 2.25 | 22 |
| 5 | 3.1 | 2.3 | 20 |
| 5 | 3.3 | NA | 17 |
| 5 | 3.9 | 3.5 | 4 |
| 5 | 3.9 | 3.55 | 1 |
| 5 | 3.9 | 3.75 | 1.5 |
| 5 | 3.9 | 3.8 | 0.5 |

Total neutralization time 40 min.
Total amount of used NaOH solution 88 ml.
*pH value at the end of the neutralization sub-step.

The filtrate had a pH of 4.1 and contained 4.3 mmol Al and 12.6 mmol F corresponding to a precipitation yield of 97.6% Al and 96.7% F.

After drying, an end product consisting of AlF$_2$OH,H$_2$O was obtained. Yield: 19.9 g. This product had the analysis shown in table 1.

As the extraction yield was on the low side, an identical run was made using 90 g of 9N sulphuric acid. The pH was 1.5 and Al and F concentrations corresponding to 222.2 and 438.5 mmol, respectively. The extraction yields in the leaching step were thereby increased to 93% Al and 96%F.

EXAMPLE 2

180 g SPL from Granges Aluminium, Sweden, from the same batch as described in example 1, were extracted with 1 l of demineralized water for 1 h at 90° C. in a preliminary leaching step. Hereby 13.3% of the SPL were dissolved. The extract was left overnight, and some minor precipitation took place.

The solid residue was separated by filtration and extracted at 90° C. in an acid leaching step for 1 h with 205 ml 9N sulfuric acid and 1000 ml water. After cooling of the slurry to room temperature, the pH was 1.05.

The extract from the preliminary leaching step was added to the slurry whereby the pH value increased to 2.1. Thereafter the pH value was increased to 4.0 by addition of 55 ml of dilute NaOH. The temperature was then raised to 60° C. for 1 h and at the end of this period, the slurry was subjected to filtration.

The temperature of the filtrate was increased to 90° C. and AlF$_2$OH hydrate was precipitated by neutralizing with dilute NaOH according to the following scheme, nitrogen being bubbled through the solution to avoid formation of ferric ions:

| Time, min | pH Setpoint | pH* | ml used |
| --- | --- | --- | --- |
| 5 | 3.2 | 2.6 | 16 |
| 5 | 3.3 | 2.55 | 20 |
| 5 | 3.4 | 2.65 | 21 |
| 5 | 3.5 | 2.6 | 21 |
| 5 | 3.6 | 2.6 | 19 |
| 5 | 3.7 | 2.75 | 40 |
| 5 | 3.8 | 2.75 | 35 |
| 5 | 3.8 | 2.8 | 23 |
| 5 | 3.8 | 3.05 | 28 |
| 5 | 3.8 | 3.5 | 29 |
| 5 | 3.9 | 3.65 | 12 |

Total neutralization time 55 min.
Total amount of used NaOH solution 264 ml.
*pH value at the end of the neutralization sub-step.

The filtrate had a pH of 3.7 and contained 124.1 mmol F corresponding to a precipitation yield of 89.8% F.

After drying, an end product consisting of AlF$_2$OH,H$_2$O was obtained. Yield: 58.06 g. This product had the analysis shown in table 1.

EXAMPLE 3

An SPLA from Comalco having the following composition: 20.0% Na, 12.7% Al, 23.5% F, 1.54% Fe and 0.96% Ca. (F/Al ratio: 2.6) was used in this example.

140 g of SPLA and 23.32 g of Al(OH)$_3$ were digested for 1.5 h at 90°–100° C. with 260 ml 9N sulfuric acid and 1200 ml of demineralized water in an acid leaching step. The resulting slurry was cooled to 60° C., neutralized to pH 4.0 with dilute NaOH solution, and filtrated.

The temperature of the filtrate was increased to 90° C. and AlF$_2$OH hydrate was precipitated by neutralizing with dilute NaOH according to the following scheme, nitrogen being bubbled through the solution to avoid formation of ferric ions:

| Time, min | pH Setpoint | pH* | ml used |
| --- | --- | --- | --- |
| 5 | 2.7 | 1.8 | 37 |
| 5 | 2.7 | 1.8 | 37 |
| 5 | 2.7 | 1.85 | 41 |
| 5 | 2.8 | 2.0 | 30 |
| 5 | 3.0 | 2.25 | 42 |
| 5 | 3.3 | 2.5 | 42 |
| 5 | 3.6 | 2.7 | 37 |
| 5 | 3.6 | 3.1 | 32 |
| 5 | 3.6 | 3.25 | 16 |
| 5 | 3.7 | 3.45 | 9 |
| 5 | 3.7 | 3.55 | 6 |

Total neutralization time 55 min.
Total amount of used NaOH solution 329 ml.
*pH value at the end of the neutralization sub-step.

The filtrate had a pH of 3.6 and contained 73.9 mmol F corresponding to a precipitation yield of 94.9% F.

After drying an end product consisting of AlF$_2$OH,H$_2$O was obtained. Yield: 76.9 g. This product had the analysis shown in table 1.

EXAMPLE 4

To illustrate the possibility of extracting a cold bath containing large amounts of sodium aluminium fluorides, neutral cryolite containing 12.69% Al and 54.12% F. (F/Al=

6.1) was digested at 90° C. for 1 h with a mixture of dilute sulfuric acid and a solution of $Al_2(SO_4)_3$ in an acid leaching step. The indicated amounts of added $Al_2(SO_4)_3$ and sulphuric acid were calculated to provide a F/Al-ratio of 2.0 in the mixture and a ("Na"/2+"F"/4)/ "SO$^-$4" ratio less than 1:

189 mmol Al 360 mmol F 25 ml of 9N $H_2SO_4$

Total volume 375 ml.

Since the starting material did not contain silica or silicate, no silica-precipitation step was performed. Therefore the mixture obtained in the acid leaching step was directly subjected to filtration in order to remove a minor amount of undissolved material.

The pH value of the filtrate was 1.15 and the F/Al ratio 1.94.

The temperature of the filtrate was increased to 95° C. and $AlF_2OH$ hydrate was precipitated by addition of dilute NaOH during a 0.5 h period under vigorous agitation.

The yield was 6.41 g of $AlF_2(OH),H_2O$. The analysis of the product is shown in table 1.

TABLE 1

| | Analysis | | | | | | |
|---|---|---|---|---|---|---|---|
| | Na, % | Al, % | F, % | SiO$_2$, % | Fe, % | LOI, % | F/Al % |
| Examp. 1 | 3.7 | 24.0 | 35.0 | 0.05 | 0.01 | 22.8 | 2.07 |
| Examp. 2 | 3.2 | 25.4 | 35.9 | 0.05 | 0.07 | 21.6 | 2.02 |
| Examp. 3 | 3.3 | 25.6 | 34.2 | 0.02 | 0.05 | 22.1 | 1.90 |
| Examp. 4 | 3.3 | 26.2 | 36.0 | NA | NA | 25.5 | 1.95 |

LOI, i.e. loss on ignition, was determined at 600° C.
NA, i.e. not analyzed.

It appears clearly from these data that a uniform end product may be produced by the present method from starting products showing great variation in chemical composition.

We claim:

1. A process for recovering aluminum and fluorine from a fluoride-containing waste material (FCWM) as $AlF_2OH$ hydrate comprising the steps of (a) conducting an acid leaching step in which FCWM is leached with dilute sulfuric acid to thereby produce an acid slurry containing fluorine, sodium and aluminum dissolved in the aqueous phase thereof and insuring the molar ratio of "F"/"Al" is in the interval from about 1.8 to 2.2, adjusting said ratio to said interval, by adding aluminum as required wherein "F" is the number of moles of leachable fluorine in the FCWM and "Al" is the number of moles of aluminum;

(b) separating the aqueous and solid phases;

(c) precipitating $AlF_2OH$ hydrate from the aqueous phase by increasing the temperature to and maintaining the temperature at a value within the interval of from about 90° C. to the boiling point of the aqueous phase and gradually increasing the pH value to about 3.7 to 4.1 by controlled continuous addition of an aqueous NaOH solution; and (d) recovering the precipitated $AlF_2OH$ hydrate, wherein the operating conditions during the entire process are such as to prevent oxidation of ferrous ions to ferric ions, and wherein the amount of sulfuric acid used in the acid leaching step is such that the molar ratio ("Na"/2+"F"/ 4)/"SO$_4^-$" is less than or equal to 1, in which "Na" is the number of moles of leachable sodium in the FCWM plus the number of equivalents of the aqueous NaOH added prior to the precipitation of the $AlF_2OH$ hydrate and "SO$_4^-$" is the number of moles of sulfate, and the amount of $H_2SO_4$ is also such that pH value of the aqueous phase during the acid leaching step does not exceed about 3.

2. A process according to claim 1, wherein the aqueous sodium hydroxide leaching solution has a sodium hydroxide concentration which allows the desired pH adjustment in the silica-precipitation step to be obtained without further addition of a separate caustic aqueous solution.

3. A process according to claims 1, wherein the acid leaching step is carried out at a temperature within the interval from about 50° to 90° C.

4. A process according to claim 3, wherein the acid leaching step is carried out within a period of time from about 0.5 to 3 hours and the amount of sulfuric acid added in the acid leaching step is such that the pH value of the aqueous phase is from about 1 to 2, the entire process is carried out such that the pH does not have a value above about 5 and the precipitated $AlF_2OH$ hydrate is calcined to produce a mixture of $AlF_3$ and $Al_2O_3$ at a temperature within the interval from about 500° to 600° C.

5. A process according to claim 4, wherein a silica-precipitation step is effected between steps (a) and (b), in which the pH of the aqueous phase is adjusted to a value within the range of about 3.7 to 4.1 at a temperature not exceeding 60° C. and the aqueous phase is allowed to stand for a period of time of not less than 0.5 hour while maintaining operating conditions so as to prevent oxidation of ferrous ions to ferric ions, wherein silica or silicate present in the FCWM precipitates.

6. A process according to claim 5, in which the FCWM is subjected to a preliminary leaching process in a preliminary leaching step wherein FCWM is leached with water or an aqueous sodium hydroxide leaching solution at a temperature within the interval from about 20° to 90° C. and within a period of time from about 0.5 to 3 h to produce a first fluorine, sodium and aluminum containing caustic solution and a solid pre-leached FCWM;

the pre-leached FCWM is transferred to the acid leaching step; and the caustic solution produced in the preliminary leaching step is combined with the slurry subjected to the silica-precipitation step.

7. A process according to claim 6, wherein the aqueous sodium hydroxide solution has a sodium hydroxide concentration which allows the desired pH adjustment in the silica-precipitation step to be obtained without further addition of a separate caustic aqueous solution.

8. A process according to claims 1, wherein the acid leaching step is carried out within a period of time from about 0.5 to 3 h.

9. A process according to claims 1, wherein the FCWM is comminuted to a particle size of less than 7 mm before leaching.

10. A process according to claim 1, wherein the acid leaching step generates hydrogen and the $AlF_2OH$ hydrate precipitation step is operated under nitrogen atmosphere.

11. A process according to claim 10, including the steps of subjecting the FCWM to a preliminary leaching process in a preliminary leaching step in which FCWM is leached with water or an aqueous sodium hydroxide leaching solution, to produce a first fluorine, sodium and aluminium containing caustic solution and a solid pre-leached FCWM;

transferring the pre-leached FCWM to the acid leaching step; and combining the caustic solution produced in the preliminary leaching step with the slurry from the acid leaching step.

12. A process according to claim 11, wherein the preliminary leaching step is carried out at a temperature within the interval from about 20° to 90° C.

13. A process according to claim 11, characterized in that the preliminary leaching step is carried out within a period of time from about 0.5 to 3 h.

14. A process according to claim 10, wherein the mixing of the reactants in the $AlF_2OH$ hydrate precipitation step is carried out with sufficient agitation to prevent formation of local domains having a pH value above about 5.

15. A process according to claim 10, wherein the precipitated $AlF_2OH$ hydrate is calcined to produce a mixture of $AlF_3$ and $Al_2O_3$ at a temperature within the interval from about 500° to 600° C.

16. A process according to claim 1, wherein a silica-precipitation step is effected between steps (a) and (b) in which the pH of the aqueous phase is adjusted to a value within the range of about 3.7 to 4.1 at a temperature not exceeding 60° C. and the aqueous phase is allowed to stand for a period of time of not less than 0.5 hour while maintaining operating conditions so as to prevent oxidation of ferrous ions to ferric ions, wherein silica or silicate present in the FCWM precipitates.

17. A process according to claim 16, wherein the mixing of the reactants in the silica-precipitation step is carried out with sufficient agitation to prevent formation of local domains having a pH value above about 5.

18. A process according to claim 16, in which the FCWM is subjected to a preliminary leaching process in a preliminary leaching step wherein FCWM is leached with water or an aqueous sodium hydroxide leaching solution to produce a first fluorine, sodium and aluminum containing caustic solution and a solid pre-leached FCWM;

the pre-leached FCWM is transferred to the acid leaching step; and the caustic solution produced in the preliminary leaching step is combined with the slurry subjected to the silica-precipitation step.

19. A process according to claim 18, in which the silica-precipitation step is carried out under a nitrogen atmosphere.

20. A process according to claim 1, wherein the amount of sulfuric acid added in the acid leaching step is such that the pH value of the aqueous phase is from about 1 to 2.

* * * * *

UNITED STATES PATENT AND TRADEMARK OFFICE
CERTIFICATE OF CORRECTION

PATENT NO. : 5,558,847

DATED : September 24, 1996

INVENTOR(S) : Henning Kaaber, et al.

Page 1 of 2

It is certified that error appears in the above-indentified patent and that said Letters Patent is hereby corrected as shown below:

On the title page: Item [22] PCT, Column 1, line 4, after abandoned insert -- This application is a 371 of PCT/DK92/00035, filed Feb. 4, 1992--.

Abstract, line 3, for "ALF$_2$OH" read --AlF$_2$OH--.

Column 2, line 38, for "aspect" read --aspect,--; line 44, for "aspect" read --aspect,--.

Column 3, line 38, for "step" read --step,--; line 59 for "specification" read --specification,--.

Column 5, line 33, for "general" read --general,--.

Column 6, line 48, for "step" read --step,--.

Column 8, line 15, for "width-a" read --width a--; line 18, after "leaching" delete the comma; line 19, for "fluorine" read --fluorine,--; line 51, for "period" read --period,--; line 60, for "Out" read --out--.

Column 9, line 5, for "process" read --process,--.

Column 10, line 59, for "drying" read --drying,--.

UNITED STATES PATENT AND TRADEMARK OFFICE
CERTIFICATE OF CORRECTION

PATENT NO. : 5,558,847
DATED : September 24, 1996
INVENTOR(S) : Henning Kaaber, et al.

It is certified that error appears in the above-indentified patent and that said Letters Patent is hereby corrected as shown below:

Column 12, line 23, for "Al$_2$O$_3$at" read --"Al$_2$O$_3$ at--; line 52, for "claims" read --claim--; line 55, for "claims" read --claim--.

Column 11, line 49, for "interval, by" read --interval by--; line 50, for "required" read --required,--; line 67, for "(Na"/2+"F"/" read --("Na"/2 + "F"/--.

Signed and Sealed this

Twenty-second Day of July, 1997

Attest:

Attesting Officer

BRUCE LEHMAN

Commissioner of Patents and Trademarks